United States Patent
Shikakura et al.

(10) Patent No.: US 7,236,706 B2
(45) Date of Patent: Jun. 26, 2007

(54) FREE SPACE OPTICS COMMUNICATION APPARATUS AND FREE SPACE OPTICS COMMUNICATION SYSTEM

(75) Inventors: Akihiro Shikakura, Tochigi (JP); Nobuo Tsuchiya, Tochigi (JP); Masatoshi Otsubo, Tochigi (JP)

(73) Assignee: Canon Kabushiki Kaisha, Ohta-Ku, Tokyo (JP)

( * ) Notice: Subject to any disclaimer, the term of this patent is extended or adjusted under 35 U.S.C. 154(b) by 936 days.

(21) Appl. No.: 10/385,256

(22) Filed: Mar. 10, 2003

(65) Prior Publication Data

US 2003/0175031 A1 Sep. 18, 2003

(30) Foreign Application Priority Data

Mar. 12, 2002 (JP) .............................. 2002-067339
Mar. 12, 2002 (JP) .............................. 2002-067340

(51) Int. Cl.
*H04B 10/00* (2006.01)
(52) U.S. Cl. ........................................ 398/129; 398/67
(58) Field of Classification Search ............ 398/66–73, 398/121–123, 128–131
See application file for complete search history.

(56) References Cited

U.S. PATENT DOCUMENTS 5,256,869 A * 10/1993 Lin et al. ................. 250/201.9

FOREIGN PATENT DOCUMENTS

| EP | 1054520 A1 | 11/2000 |
|---|---|---|
| JP | 9-139963 | 5/1997 |
| JP | 2000-224112 | 8/2000 |

* cited by examiner

*Primary Examiner*—Christina Leung
(74) *Attorney, Agent, or Firm*—Morgan & Finnegan, L.L.P.

(57) ABSTRACT

A free space optics communication apparatus is provided which allows flexible setting in accordance with the number or distances of other apparatuses in single-to-multipoint communication.

The free space optics communication apparatus has a movable mirror array which has a plurality of mirrors capable of reflecting a light signal from a light source and arranged in a matrix-like form, and a mirror control circuit for controlling the directions of the respective mirrors to form a plurality of mirror groups which reflect the light signal toward the other apparatuses in the movable mirror array. The number of the mirror groups formed in the movable mirror array through the control of the directions of the mirrors by the mirror control circuit is changeable.

7 Claims, 15 Drawing Sheets

104a'  104'

304a' 304'

PRIOR ART

FREE SPACE OPTICS COMMUNICATION APPARATUS AND FREE SPACE OPTICS COMMUNICATION SYSTEM

BACKGROUND OF THE INVENTION

1. Field of the Invention

The present invention relates to a free space optics communication apparatus which uses a light signal propagating through the air to perform communication from a single point to a plurality of points at remote locations.

2. Description of the Related Art

Free space optics communication apparatuses for so-called point-to-multipoint communication have been proposed which use light signals propagating through the air to perform communication from a single point to a plurality of points at remote locations simultaneously. Some of the free space optics communication apparatuses are of a type which realizes the communication by providing a predetermined number of movable mirrors disposed in luminous flux emitted from a single light source and setting different directions of the movable mirrors.

FIG. 15 shows an example of the apparatus configured as described above. In FIG. 15, reference numeral 70 shows a free space optics communication apparatus installed on the one point side of the point-to-multipoint communication. Reference numerals 71a, 71b, and 71c show other spatial light apparatuses on the multipoint side installed at a plurality of points at remote locations, with which the apparatus 70 is to communicate.

A light signal emitted from a light source 701 is converted by an optical system 702 into a light beam 703 which has a substantially parallel shape with slight divergence. The light beam 703 is divided and reflected by three movable mirrors 704a, 704b, and 704c disposed in the luminous flux of the beam to travel toward the other apparatuses 71a, 71b, and 71c separately. In this manner, the signal is transmitted to the respective other apparatuses.

Each of the movable mirrors 704a, 704b, and 704c is configured to allow free setting of its direction. The directions of the movable mirrors 704a, 704b and 704c are set when the apparatus is installed such that reflected light beams can be transmitted toward the respective other apparatuses 71a, 71b, and 71c.

Such a configuration can realize the free space optics communication apparatus for point-to-multipoint communication which can communicate with a plurality of other apparatuses through the light beam emitted from the single light source 701.

It is rare that the plurality of other apparatuses is installed at equal distances from the free space optics communication apparatus. In most cases, the respective other apparatuses are installed at different distances.

Conventionally, however, the plurality of movable mirrors generally have the same sizes. This leads to a large difference in communication quality between a case where the apparatus communicates with a different apparatus installed at a long distance and a case where the apparatus communicates with the other apparatus installed at a short distance.

On the other hand, when different levels of communication quality are required by the plurality of other apparatuses, it is difficult for the conventional apparatus to flexibly set the communication quality to satisfy the requirements.

In the aforementioned related art, the number of the movable mirrors in the free space optics communication apparatus is determined in the manufacturing stage of the apparatus. However, in an environment in which the apparatus is actually used, the number of movable mirrors in the apparatus is not always consistent with the number of other apparatuses to be communicated with, and is rather inconsistent in many cases.

When the actual number of the other apparatuses is smaller than the number of the movable mirrors provided in the apparatus, a certain number of movable mirrors are not used corresponding to the difference between them. Light from the light source is always made incident on the movable mirrors which are not used, and such light incident on those movable mirrors unnecessary. For example, when an apparatus having four movable mirrors is used for communication with two other apparatuses installed at two locations, only half of the power of the light source is effectively used.

On the other hand, when the number of other apparatuses is larger than the number of the movable mirrors provided in the apparatus only by one, for example, an additional free space optics communication apparatus needs to be installed. In this manner, the conventional free space optics communication apparatus has poor flexibility for use in actual point-to-multipoint communication to result in the inability to effectively utilize the performance which the free space optics communication apparatus has originally.

SUMMARY OF THE INVENTION

It is an object of the present invention to provide a free space optics communication apparatus which allows a flexible setting in accordance with the number or distances of other apparatuses in single-to-multiple-point communication to maximize the effective use of the performance which the apparatus has originally, regardless of the number of other apparatuses.

To achieve the object, the free space optics communication apparatus according to the present invention has a light source which emits a light signal, a movable mirror array which has a plurality of mirrors capable of reflecting the light signal from the light source and arranged in a matrix-like form, the directions of the respective mirrors being controllable independently, and a mirror control circuit which controls the directions of the respective mirrors to form a plurality of mirror groups which reflect the light signal toward the other different apparatuses, in the movable mirror array, respectively. The number of the mirror groups formed in the movable mirror array through the control of the directions of the mirrors by the mirror control circuit can be changed.

A detailed configuration of the free space optics communication apparatus and the free space optics communication system of the invention, the above and other objects and features of the invention will be apparent from the embodiments, described below.

DESCRIPTION OF THE PREFERRED EMBODIMENTS

Hereinafter, preferred embodiments of the invention will be described in detail with reference to the drawings.

Embodiment 1

Figure 1:
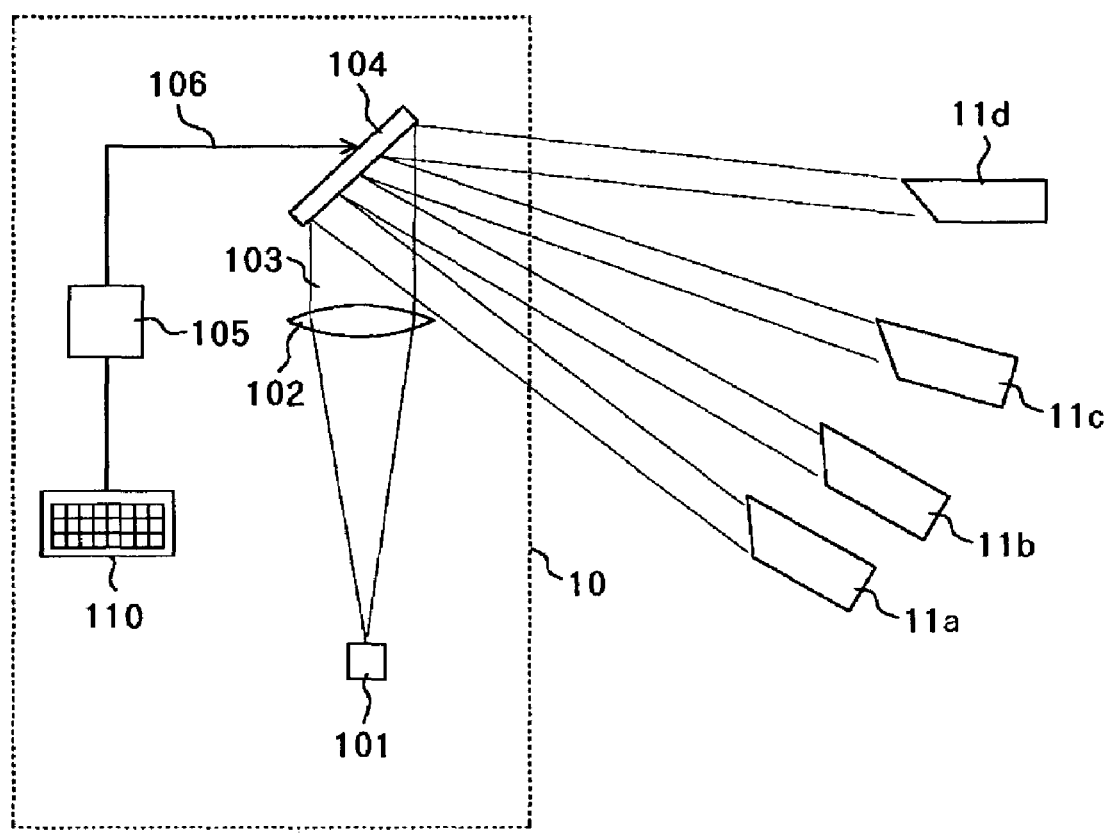
FIG. 1 is a schematic diagram of a free space optics communication system which is Embodiment 1 of the present invention.

FIG. 1 shows a free space optics communication system which is Embodiment 1 of the present invention. In FIG. 1, reference numeral 10 shows a free space optics communication apparatus installed on the one point side of point-to-multipoint communication according to the present invention. Reference numerals 11a, 11b, 11c, and 11d show other free space optics communication apparatuses (hereinafter referred to as "other apparatuses") on the multipoint side installed at a plurality of different points at remote locations.

In the free space optics communication apparatus 10, a light signal emitted from a light source 101 is converted by an optical system 102 into a light beam 103 which has a substantially parallel shape with slight divergence. The light beam 103 is reflected by a movable mirror array 104 in four different directions in which the four other apparatuses 11a, 11b, 11c, and 11d are installed.

Figure 3:
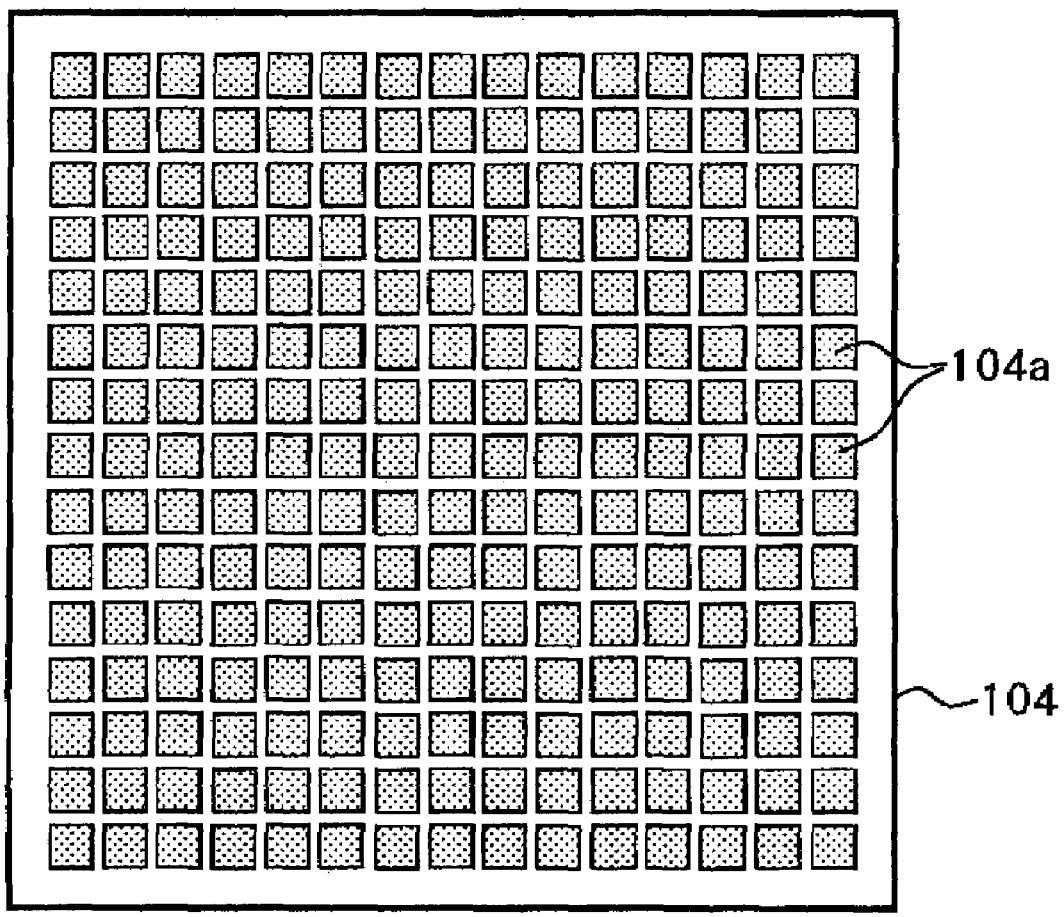
FIG. 3 is an explanatory view showing the configuration of the movable mirror array in Embodiment 1.

As shown in FIG. 3, the movable mirror array 104 is composed of a number of mirrors (16×16 mirrors in the example of FIG. 3) 104a arranged in a matrix-like form. The directions of the individual mirrors 104a therein are freely changed individually by an actuator such as a motor, not shown, driven in response to a control signal 106 (see FIG. 1) output from a mirror control circuit 105.

Figure 2:
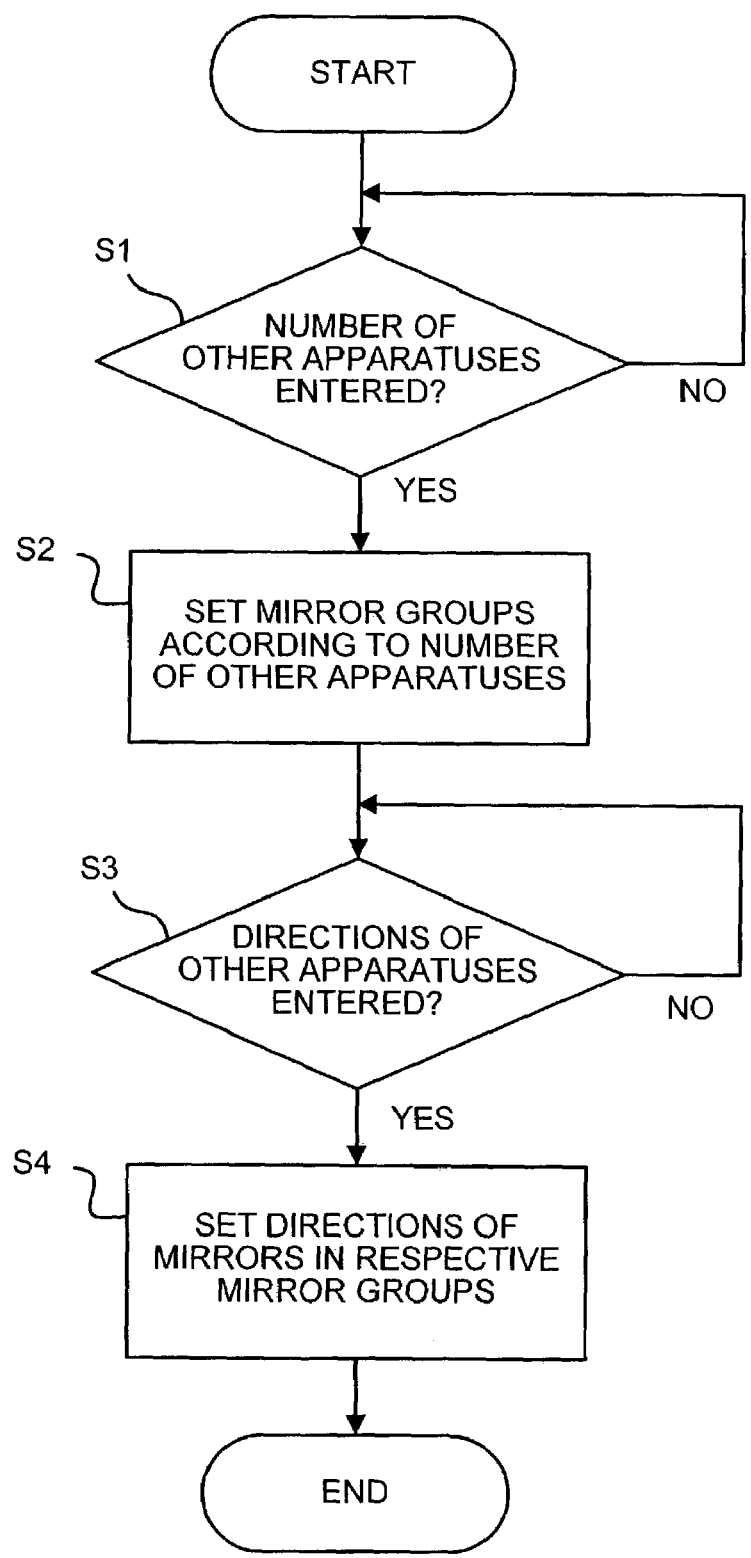
FIG. 2 is a flow chart for controlling a movable mirror array used in a free space optics communication apparatus forming part of the free space optics communication system of Embodiment 1.

Next, the control of the movable mirror array 104 by the mirror control circuit 105 is described with reference to FIG. 1 and a flow chart of FIG. 2.

When the free space optics communication apparatus 10 is installed, an operator enters the number of the other apparatuses 11a, 11b, 11c, and 11d (four in the present embodiment) through an input unit 110 such as a keyboard connected to the mirror control circuit 105 (step (shown as "S" in FIG. 2) 1). In response to the entered number of the other apparatuses, the mirror control circuit 105 sets the same number of mirror groups as the number of other apparatuses in the movable mirror array 104 such that the same number of mirrors 104a belong, to each of the mirror groups (in other words, the same reflective areas are set on the movable mirror array 104) (step 2).

Figure 4:
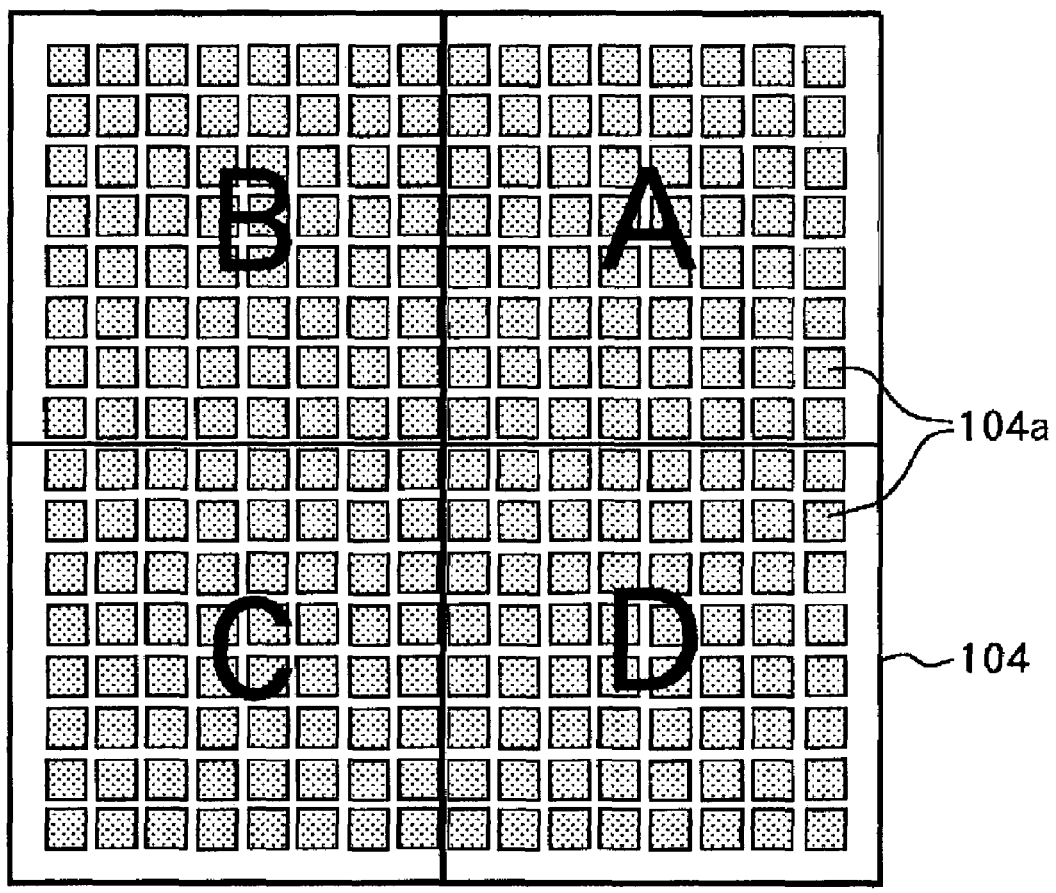
FIG. 4 shows how mirrors are grouped in the movable mirror array when four other apparatuses exist in Embodiment 1.

FIG. 4 shows the four mirror groups set in the movable mirror array 104, that is, the state of the movable mirror array 104 when the four other apparatuses exist. In this case, the 16×16 mirrors are divided into four mirror groups A, B, C, and D which are each composed of the same number of mirrors, 8×8 mirrors.

The mirror group A is used for communication with the other apparatus 11a, the mirror group B is used for communication with the other apparatus 11b, the mirror group C is used for communication with the other apparatus 11c, and the mirror group D is used for communication with the other apparatus 11d.

At step 3, the operator enters the directions of the other apparatuses 11a, 11b, 11c, and 11d viewed from the free space optics communication apparatus 10 through the input unit 110. Then, the mirror control circuit 105 assigns each of the mirror groups to each of the other apparatuses and controls the directions of the mirrors 104a belonging to the respective mirror groups to reflect the light signal from the light source 101 toward the corresponding other apparatuses (sets the same directions for each mirror group or the directions for converging light to the corresponding other apparatus) (step 4).

With the directional setting of the mirrors 104a in this manner, the light beam 103 incident on the movable mirror array 104 is divided and reflected by the four mirror groups A to D in the four different directions in which the other apparatuses 11a, 11b, 11c, and 11d are installed. The four divided and reflected beams of luminous flux are received by the other apparatuses 11a, 11b, 11c, and 11d for point-to-multipoint communication.

When the number or directions of the other apparatuses to be communicated with are changed, the operator enters the new number or directions of the other apparatuses through the input unit 110. The mirror control circuit 105 outputs the control signal 106 to again set the directions of the respective mirrors 104a of the movable mirror array 104. Thus, mirror groups are formed corresponding to the new number of the other apparatuses, and the mirrors 104 belonging to the respective mirror groups are set to a directions corresponding to the new directions of the other apparatuses.

Figure 5:
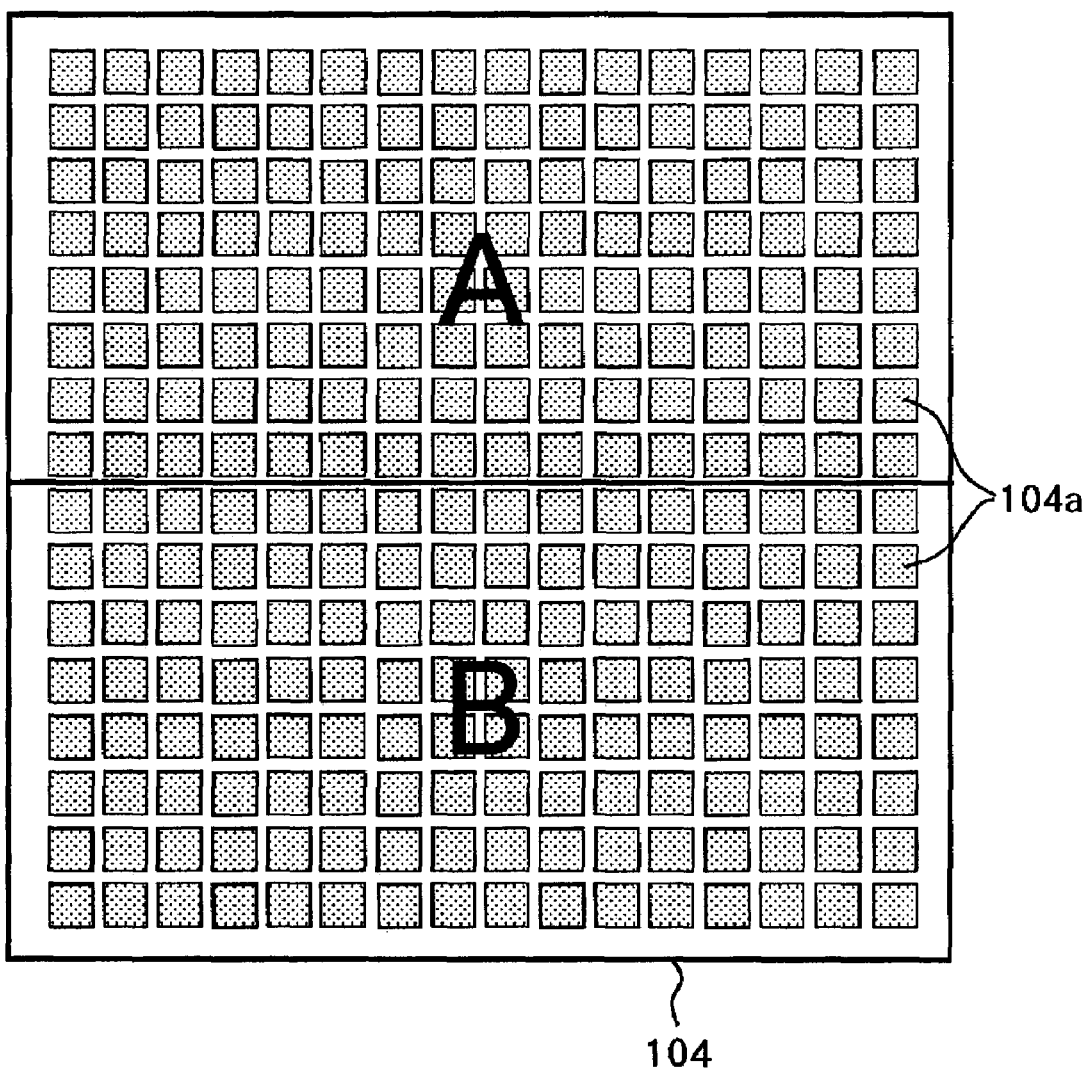
FIG. 5 shows how mirrors are grouped in the movable mirror array when two other apparatuses exist in Embodiment 1.

For example, when there are only two other apparatuses installed originally, or when an light signal is actually transmitted to only two of the four other apparatuses, two mirror groups A and B are formed in the movable mirror array 104 as shown in FIG. 5. In this event, the mirror control circuit 105 controls the directions of the mirrors 104a belonging to the respective mirror groups to reflect the light signal from the light source 101 toward the corresponding other apparatuses.

The number of other apparatuses to which the light signal is actually transmitted is determined, for example, by the mirror control circuit 105 reading the number of destinations (other apparatuses) shown in a header of the signal to be transmitted. The mirror control circuit 105 controls the direction of the respective mirrors 104a to form the same number of mirror groups as the determined number.

In this manner, the light beams 103 reflected by the mirrors 104a belonging to the mirror groups A and B travel in two different directions and are received by the corresponding other apparatuses.

A comparison of the case where the four other apparatuses exist and the case where two other apparatuses exist shows that, even when the number of the other apparatuses is changed, only the number of the mirror groups formed in the movable mirror array 104 needs to be changed between two and four through the mirror direction control by the mirror control circuit 105 to efficiently allocate almost all of the emitted light from the light source 101 to the respective other apparatuses without waste.

As described above, in Embodiment 1, a number of mirrors 104a constituting the movable mirror array 104 is divided into groups, the number of which corresponds to the number of other apparatuses actually installed or the number of the other apparatuses with which there will be communication. This enables communication with the luminous flux from the light source 101 to be effectively used regardless of the number of the other apparatuses.

While the present embodiment has been described using the case where the four other apparatuses exist and the case where two other apparatuses exist, the number of other apparatuses and thus the number of mirror groups formed in the movable mirror array 104 are not limited thereto.

In addition, while the present embodiment has been described for 16×16 mirrors constituting the movable mirror array 104, the number of the mirrors constituting the movable mirror array is not limited thereto in the present invention.

The present embodiment has been described for the grouping of the mirrors such that all the mirror groups A, B, C, and D have the exactly same number of mirrors, but it is possible that all the mirrors cannot be divided by the number of mirror groups (with a remainder). In this case, the mirrors may be grouped such that the respective mirror groups have nearly the same number of mirrors, for example by allocating the remaining mirrors to some of the mirror groups. In other words, the numbers of mirrors belonging to the respective mirror groups is handled as substantially the same even when there is a certain difference among them as long as the mirror groups can be considered to have equivalent reflective areas, as well as when they have the exactly same number of mirrors.

The present embodiment has been described for the entry of the number of other apparatuses through the input unit 110 and the setting of the mirror groups by the mirror control circuit 105 based on the entered number. The setting of the mirror groups, however, can be performed in other methods.

For example, it is possible to use a method in which a different number or symbol is assigned to each of the mirrors constituting the movable mirror array, and the numbers or symbols of the mirrors belonging to respective mirror groups are specified through the input unit connected to the mirror control circuit. Alternatively, regions of mirrors belonging to respective mirror groups on the movable mirror array may be specified through the input unit.

While the present embodiment has been described for the driving of the respective mirrors constituting the movable mirror array 104 by the actuator, it is possible that the respective mirrors are formed on a silicon wafer and a voltage is applied to create distortion to drive the mirrors about two axes orthogonal to each other and parallel to the mirror surface.

Embodiment 2

Figure 6:
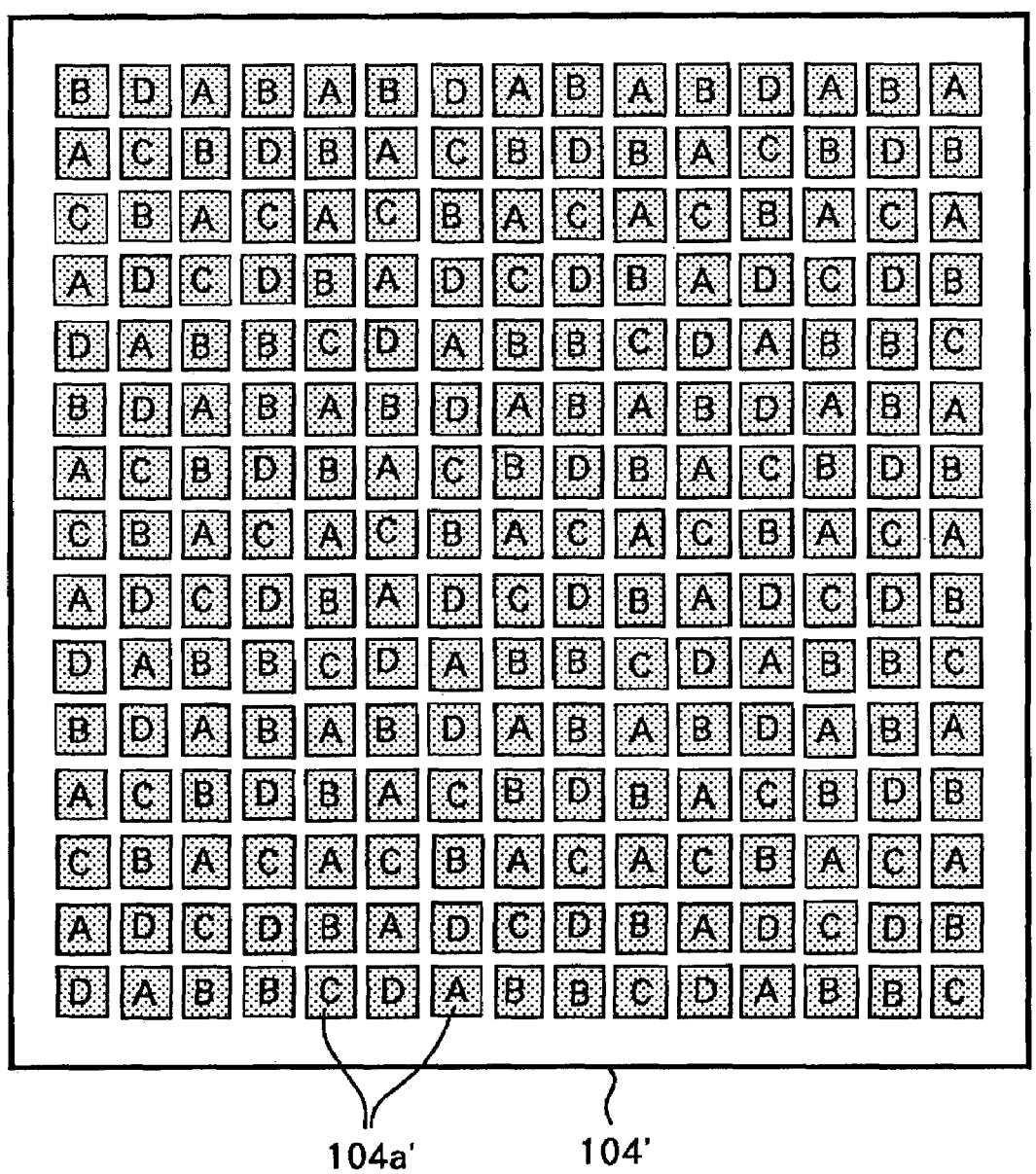
FIG. 6 shows how mirrors are grouped in a movable mirror array when four other apparatuses exist in a free space optics communication system which is Embodiment 2 of the present invention.

In aforementioned Embodiment 1, the respective mirror groups are formed collectively and adjacent to each other. As shown in FIG. 6, mirrors 104a' belonging to respective mirror groups may be arranged discretely in a movable mirror array 104' (however, they may be arranged regularly to some extent).

FIG. 6 shows four mirror groups formed in the movable mirror array 104'. Symbols A to D assigned to the respective mirrors represent mirror groups to which those mirrors belong.

Embodiment 3

Figure 7:
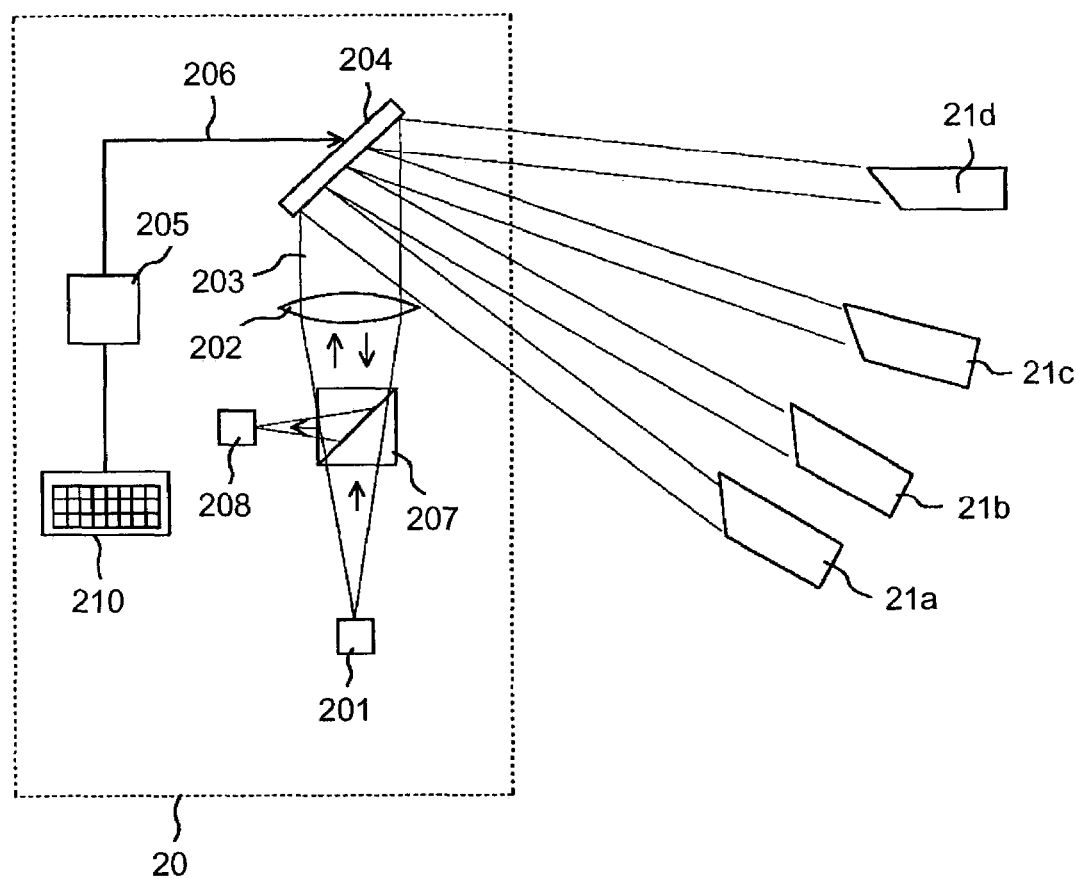
FIG. 7 is a schematic diagram of a free space optics communication system which is Embodiment 3 of the present invention.

While aforementioned Embodiments 1 and 2 have been described on the assumption that one-way communication is performed on a point-to-multipoint basis, the present invention is applicable to bi-directional point-to-multipoint communication. FIG. 7 shows a free space optics communication system assuming the bi-directional communication.

In FIG. 7, reference numeral 20 shows a free space optics communication apparatus installed on the one point side of point-to-multipoint communication according to the present invention. Reference numerals 21a, 21b, 21c, and 21d show other free space optics communication apparatuses (hereinafter referred to as "other apparatuses") on the multipoint side installed at a plurality of different points at remote locations.

The free space optics communication apparatus 20 of the present embodiment is configured to have a polarization beam splitter 207 which separates a transmission light signal and a reception light signal and a light-receiving element 208 which are added to the components described in Embodiment 1.

A light signal emitted from a light source 201 enters into the polarization beam splitter 207. Since the incident light from the light source 201 is polarized in a direction for transmission through the polarization beam splitter 207, the light passes through the polarization beam splitter 207 and enters into an optical system 202. The light is converted by the optical system 202 to a light beam 203 which has a substantially parallel shape with slight divergence before incidence on a movable mirror array 204.

The description in Embodiment 1 also applies to the configuration of the movable mirror array 104 and the control of the directions of the mirrors in the movable mirror array 204 by an input unit 210 and a mirror control circuit 205.

Thus, the light beam 203 is reflected by four mirror groups formed in the movable mirror array 204 in four different directions in which the four other apparatuses 21a, 21b, 21c, and 21d are installed, respectively, and the light signal is received by the respective other apparatuses.

On the other hand, four light beams transmitted from the respective other apparatuses 21a, 21b, 21c, and 21d are reflected by the four mirror groups formed in the movable mirror array 204 toward the optical system 202. These received light beams are polarized in directions for reflection by polarized light separating surfaces of the polarization beam splitter 207, unlike the transmission light from the light source 201.

Thus, the received light beams enters into the polarization beam splitter 207 are reflected by the polarized light separating surfaces and guided to the light-receiving element 208. In this manner, the light signals from the four other apparatuses 21a, 21b, 21c, and 21d are received by the single light-receiving element 208.

As described above, according to the present embodiment, the bi-directional communication can be performed between the free space optics communication apparatus 20 and the plurality of other apparatuses 21a, 21b, 21c, and 21d.

When the number or directions of the other apparatuses to be communicated with are changed, the operator enters the new number or directions of the other apparatuses through the input unit 210 similarly to the description in Embodiment 1. The mirror control circuit 205 outputs a control signal 206 to again set the directions of the respective mirrors 204a of the movable mirror array 204.

In this manner, a number of mirrors constituting the movable mirror array 204 are divided into groups, the number of which corresponds to the number of the other apparatuses actually installed or the number of the other apparatuses with which there will be communication. Consequently, the luminous flux for transmission from the light source 201 can be effectively used regardless of the number of the other apparatuses, and the received light from the plurality of other apparatuses can be incident on the single light-receiving element 208 without waste.

In the present embodiment, the number of the other apparatuses to which communication is possible, and thus the maximum number of mirror groups formed in the movable mirror array 204 are not limited to four.

Aforementioned Embodiments 1 and 3 have been described for the case where the operator enters the directions of the other apparatuses through the input units 110 and 210 and the entered directional information is relied on to control the directions of the respective mirrors of the movable mirror arrays 104 and 204 by the mirror control circuits 105 and 205. Instead of the directions, the operator may enter information of the positions of the other apparatuses (for example, the latitude or longitude) to control the directions of the respective mirrors in accordance with the entered position information.

According to Embodiments 1 and 2 described above, the number of mirror groups for reflecting the light signal toward the different other apparatuses can be set freely corresponding to the number of the other apparatuses. Thus, the transmission light emitted from the light source can be divided and transmitted to the plurality of other apparatuses separately without waste. In other words, a change in number of the other apparatuses can be responded to flexibly.

According to Embodiment 3, the number of mirror groups for reflecting and guiding the light signals from the other different apparatuses to the light-receiving element can be set freely corresponding to the number of the other apparatuses. Thus, the received light from the plurality of other apparatuses can be incident on the single light-receiving element without waste. In other words, a change in number of the other apparatuses can be responded to flexibly.

In addition, as described in Embodiments 1 and 3, the respective mirror groups have substantially the same number of mirrors belonging thereto. As a result, communication with the plurality of other apparatuses can be performed at equivalent levels of communication quality if the same communication environments are provided including the presence or absence of obstructions.

Embodiment 4

Figure 8:
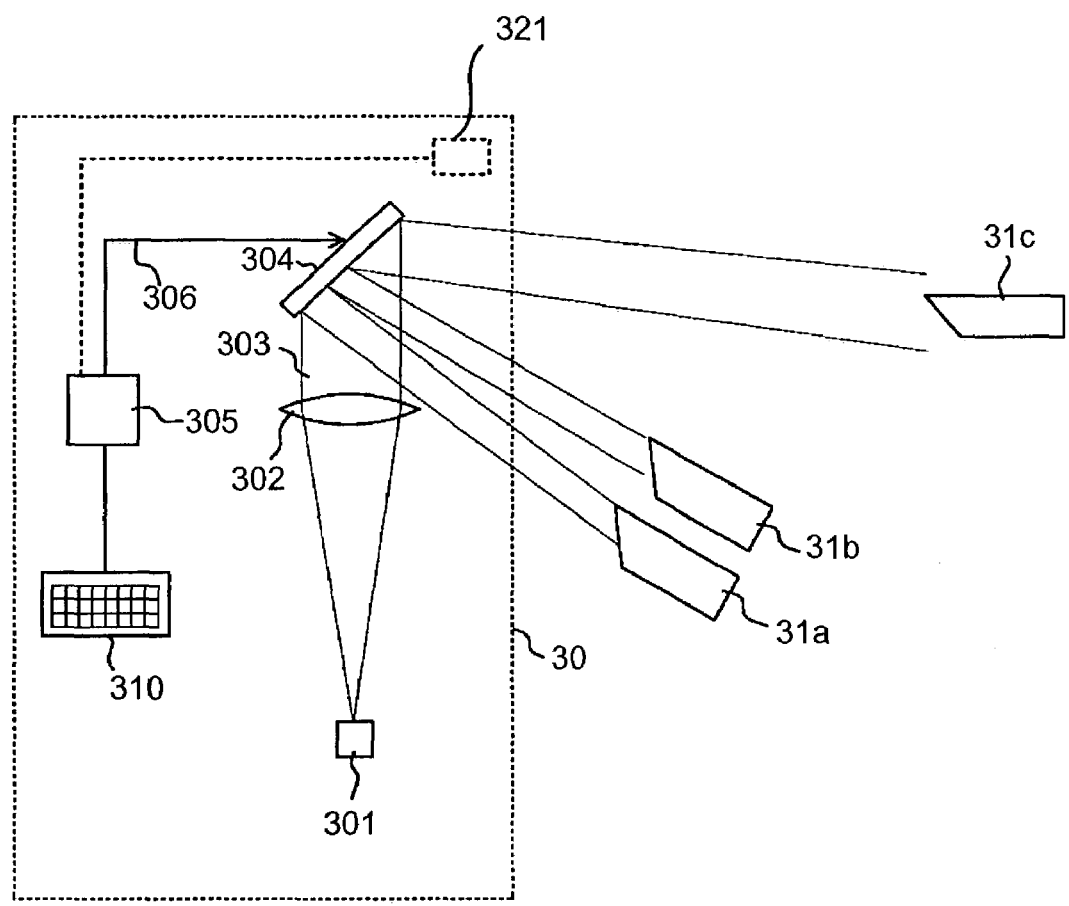
FIG. 8 is a schematic diagram of a free space optics communication system which is Embodiment 4 of the present invention.

FIG. 8 shows a free space optics communication system which is Embodiment 4 of the present invention. In FIG. 8, reference numeral 30 shows a free space optics communication apparatus installed on the one point side of the point-to-multipoint communication according to the present invention. Reference numerals 31a, 31b, and 31c show other free space optics communication apparatuses (hereinafter referred to as "other apparatuses") on the multipoint side installed at a plurality of different points at remote locations.

In the free space optics communication apparatus 30, a light signal emitted from a light source 301 is converted by an optical system 302 to a light beam 303 which has a substantially parallel shape with slight divergence. The light beam 303 is reflected by a movable mirrors array 304 in three different directions in which the three other apparatuses 31a, 31b, and 31c are installed.

Figure 10:
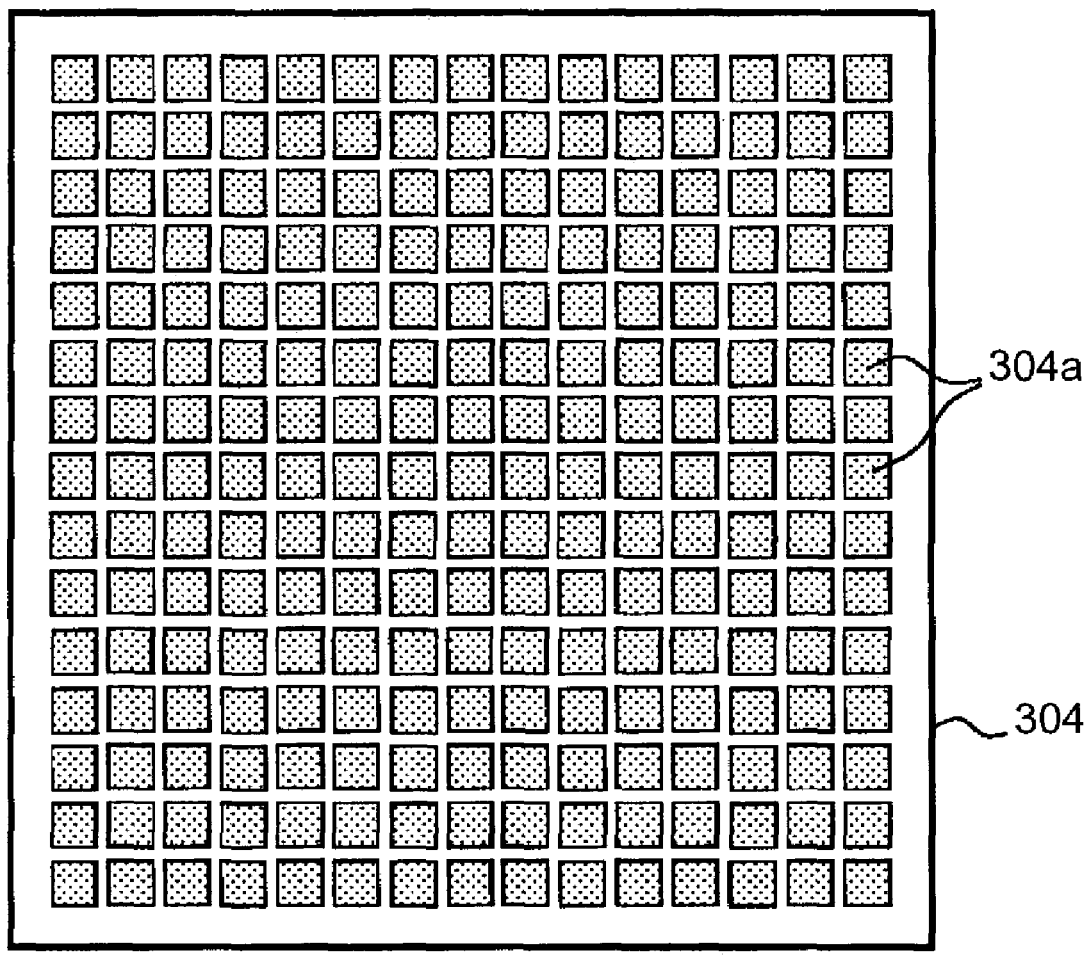
FIG. 10 is an explanatory view showing the configuration of the movable mirror array in Embodiment 4.

As shown in FIG. 10, the movable mirror array 304 is comprised of a number of mirrors (16×16 mirrors in the example of FIG. 10) 304a arranged in a matrix-like form. The directions of the individual mirrors 304a therein are freely changed individually by an actuator such as a motor, not shown, driven in response to a control signal 306 output from a mirror control circuit 305.

Figure 9:
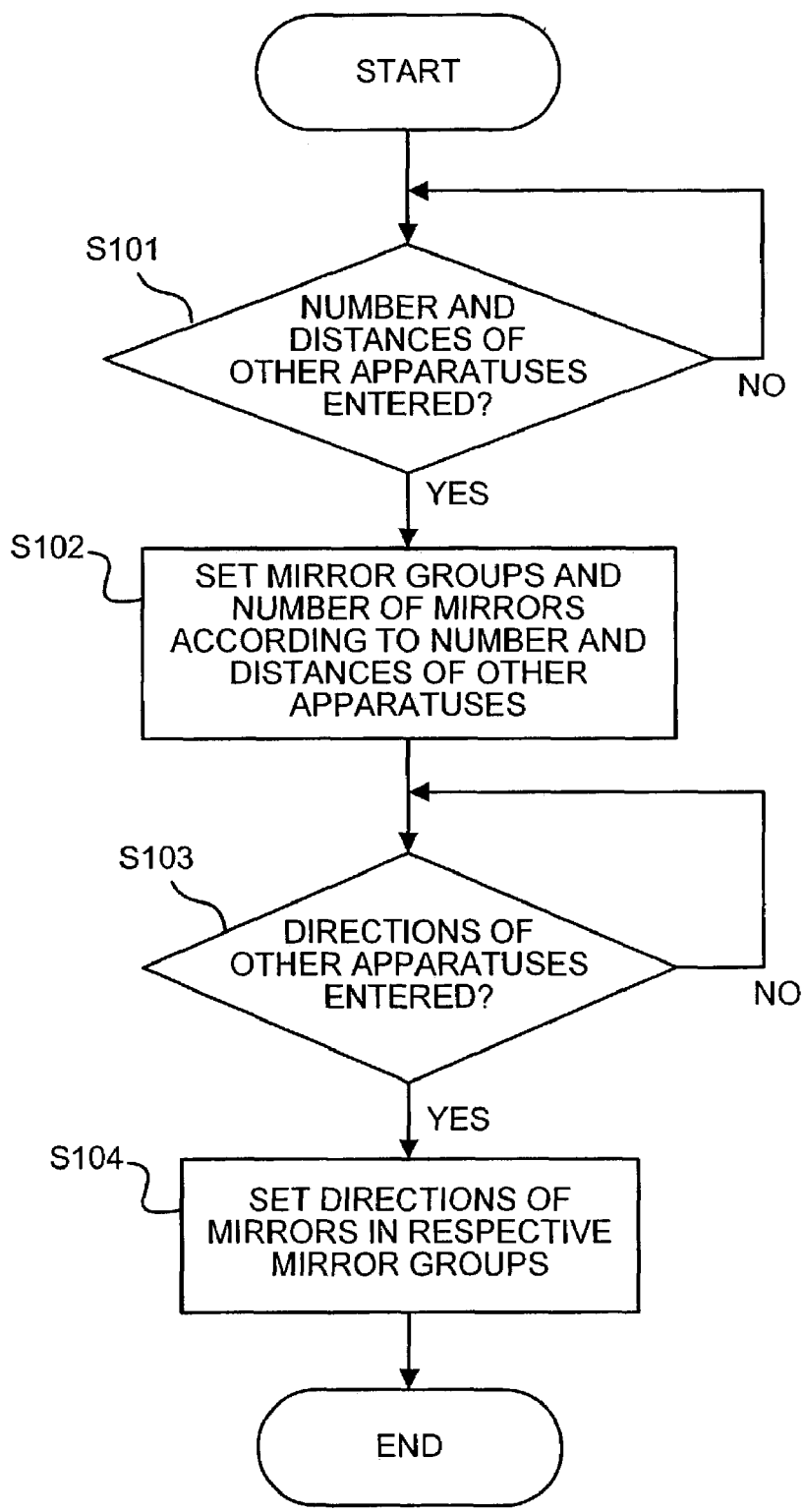
FIG. 9 is a flow chart for controlling a movable mirror array used in a free space optics communication apparatus forming part of the free space optics communication system of Embodiment 4.

Next, the control of the movable mirror array 304 by the mirror control circuit 305 is described with reference to FIG. 8 and a flow chart of FIG. 9.

When the free space optics communication apparatus 30 is installed, an operator enters the number of the other apparatuses 31a, 31b, and 31c (three in the present embodiment) and information on distances to the other respective apparatuses through an input unit 310 such as a keyboard connected to the mirror control circuit 305 (step 101). The mirror control circuit 305 sets the same number of mirror groups as the entered number of the other apparatuses such that each mirror group has a certain number of the mirrors 304a belonging thereto, the number of which depends on the entered distance to the corresponding other apparatus.

If the distance to the other apparatus 31c is longer than those to the other apparatuses 31a and 31b, the numbers of the mirrors 304 belonging to the respective mirror groups are determined such that a larger amount of luminous flux for communication is emitted to the other apparatus 31c farther away than that to the closer other apparatuses 31a and 31b. Specifically, the number of the mirrors 304a belonging to the mirror group corresponding to the other apparatus 31c farther away is set to be larger (to provide a larger reflective area on the movable mirror array 304) than the numbers of the mirrors 304a belonging to the mirror groups corresponding to the closer apparatuses 31a and 31b.

In other words, as other apparatus is located at a longer distance, a larger number of the mirrors 304a are set for reflecting the light signal to that other apparatus, thereby setting substantially equal values of the light received at all the other apparatuses 31a, 31b, and 31c. This enables communication with the plurality of other apparatuses while substantially the same levels of communication quality are maintained regardless of the communication distances.

For example, when the distance to the other apparatus 31c is approximately 1.4 times larger than those to the other apparatuses 31a and 31b, the mirror control circuit 305 sets the number of the mirrors 304a belonging to the mirror group corresponding to the other apparatus 31c which is further away to be twice (an integral multiple closest to the square of the distance ratio 1.4) as many as the numbers of the mirrors 304a belonging to the mirror groups corresponding to the closer other apparatuses 31a and 31b.

Figure 11:
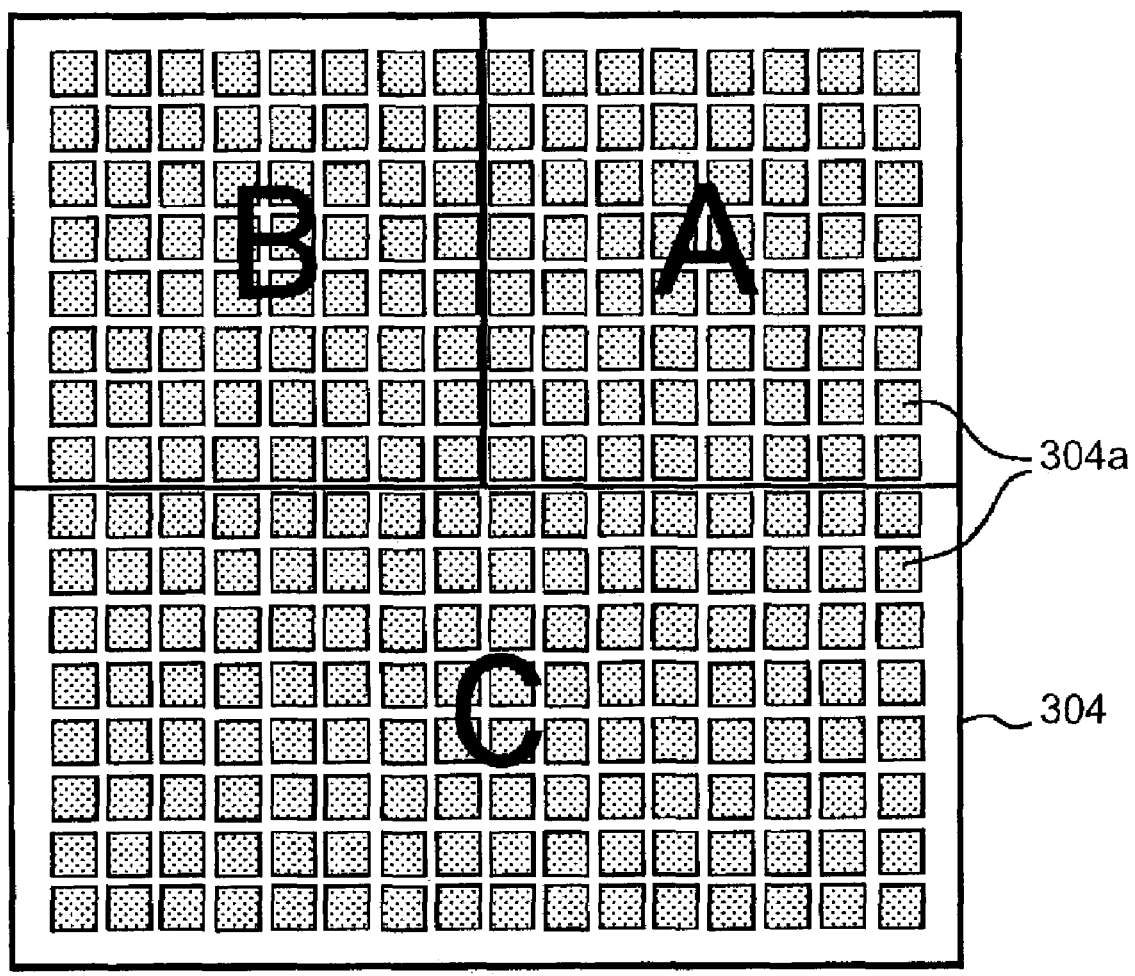
FIG. 11 shows how mirrors are grouped in the movable mirror array when three other apparatuses exist in Embodiment 4.

FIG. 11 shows the state of the movable mirror array 304 in this case. In FIG. 11, two mirror groups A and B to which 8×8 mirrors 304a belong and a mirror group C to which 8×16 mirrors 304a belong are formed in the movable mirror array 304 having 16×16 mirrors 304a.

The mirror group A is used for communication with the other apparatus 31a, and the mirror group B is used for communication with the other apparatus 31b. The mirror group C is used for communication with the other apparatus 31c.

At step 103, the operator enters the directions of the other respective apparatuses 31a, 31b, and 31c viewed from the free space optics communication apparatus 30 through the input unit 310. The mirror control circuit 305 controls the directions of the mirrors 304a constituting the respective mirror groups to reflect the light signal from the light source 301 toward the corresponding other apparatuses (the same directions for each mirror group or the directions for converging light to the corresponding other apparatuses) (step 104).

With the setting of the directions of the mirrors 304a in this manner, the light beam 303 incident on the movable mirror array 304 is divided and reflected by the three mirror groups A to C in three different directions in which the other apparatuses 31a, 31b, and 31c are installed. The three divided and reflected beams of luminous flux are received by the other apparatuses 31a to 31c for point-to-multipoint communication.

The amount of the reflected luminous flux to the farthest other apparatus 31c is larger than those of the reflected luminous flux to the other apparatuses 31a and 31b in accordance with the distance ratio. Consequently, communication with the plurality of other apparatuses can be performed at equivalent levels of communication quality if the same communication environments are provided including the presence or absence of obstructions.

When the number, directions, or distances of the other apparatuses to be communicated with are changed, the operator enters the new number, directions, or distances of the other apparatus through the input unit 310. The mirror control circuit 305 outputs the control signal 306 to again set the directions of the respective mirrors 304a of the movable mirror array 304. Thus, mirror groups are formed corresponding to the new number of the other apparatuses, and the mirrors 304a included in the respective mirror groups are directed to face the corresponding other apparatuses and the numbers thereof depend on the distances to the corresponding other apparatuses.

Figure 12:
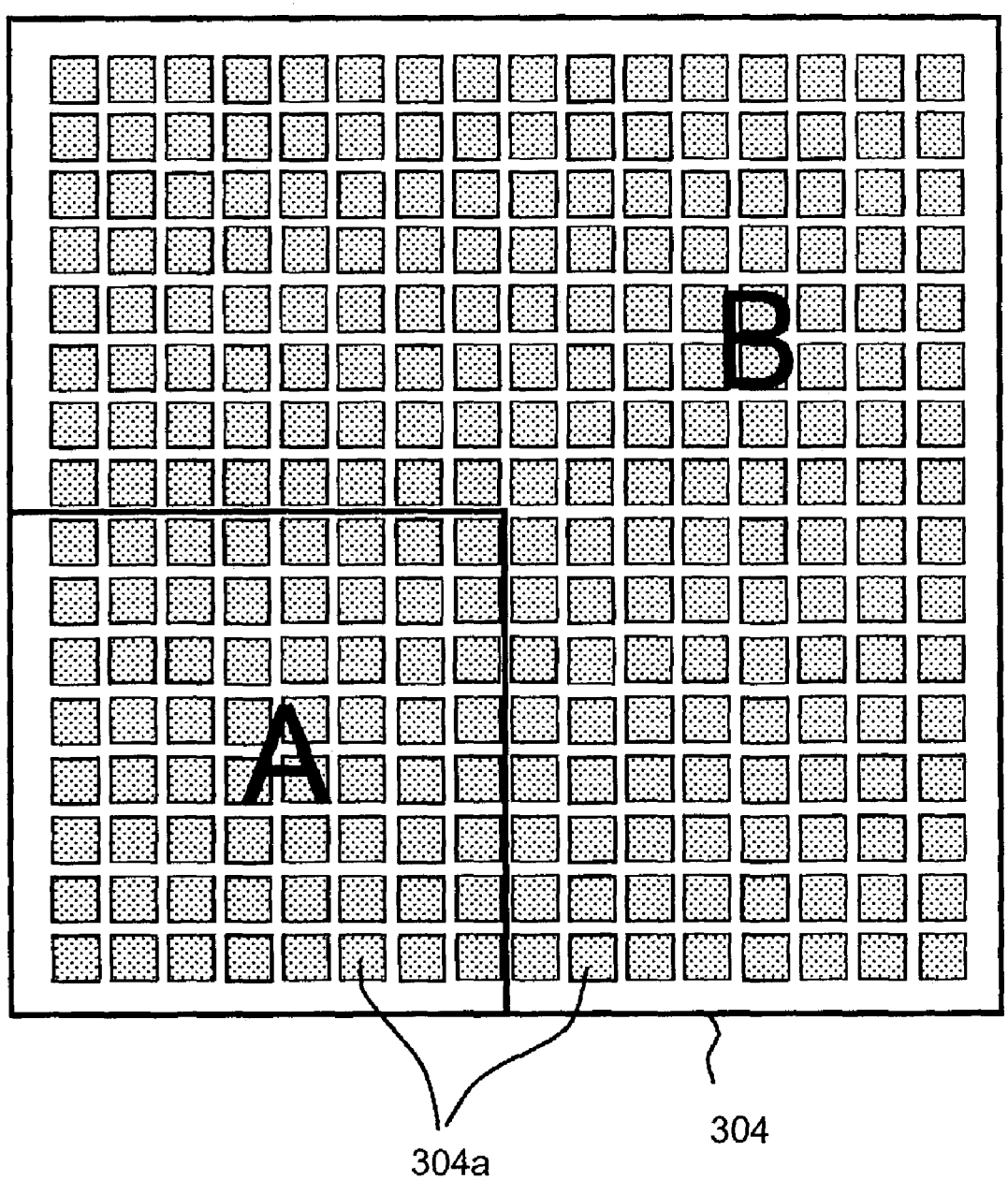
FIG. 12 shows how mirrors are grouped in the movable mirror array when two other apparatuses exist in Embodiment 4.

For example, FIG. 12 shows the states of the movable mirror array 304 when two other apparatuses exist and the ratios of the distances to the other apparatuses are approximately 1:1.7.

In this case, two mirror groups A and B are formed in the movable mirror array 304. The directions of the mirror 304a constituting the respective mirror groups are set to reflect the light signal from the light source 301 to the corresponding other apparatuses.

The number of the mirrors 304a belonging to the mirror group B corresponding to the other apparatus further away is three times larger than that of the mirrors 304a belonging to the mirror group A corresponding to the closer other apparatus since it is an integral multiple closest to the square of 1.7.

The light beams 303 reflected by the mirrors 304a belonging to the respective mirror groups A and B travel in two different directions and are received by the corresponding other apparatuses.

A comparison of the case where the three other apparatuses exist and the case where the two other apparatuses exists show that, even when the number, directions, or distances of the other apparatus are changed, only the number of the mirror groups formed in the movable mirror array 304 and the directions and numbers of the mirrors 304a belonging to the respective mirror groups need to be changed through the mirror directional control by the mirror control circuit 305 to efficiently allocate almost all of the emitted light from the light source 301 to the respective other apparatuses without waste. In addition, equivalent levels of quality can be ensured in the communication with the respective other apparatuses regardless of the difference in distance.

While the present embodiment has been described for the case where the three other apparatuses exist and the case where the two other apparatuses exist, the number of the other apparatuses and thus the number of the mirror groups formed in the movable mirror arrays 304 are not limited thereto.

In addition, while the present embodiment has been described for 16×16 mirrors constituting the movable mirror array 304, the number of the mirrors constituting the movable mirror array is not limited thereto in the present invention.

The present embodiment has been described for the case where the distance ratio of 1:1.4 between the distances to the two other apparatus and that to the one other apparatus and the distance ratio of 1:1.7 between the distances to the two other apparatuses. However, the present invention is applicable to a distance ratio other than the aforementioned ones, including when three or more other apparatuses are installed at different distances.

The ratio of the numbers of the mirrors with respect to the distance ratio is not limited to the integral multiple closest to the square of the distance ratio described above, and other relationships may be used to calculate the ratio of the number of the mirrors.

As described above, according to the present embodiment, a number of mirrors 304a constituting the movable mirror array 304 is divided into groups, the number of which corresponds to the number of apparatuses actually installed or the number of the other apparatuses to be actually communicated with, out of the plurality of installed other apparatuses. It is thus possible to realize the flexible free space optics communication system capable of communication with the luminous flux from the light source 301 being effectively used regardless of the number of the other apparatuses.

The number of the other apparatuses to be communicated with actually is determined, for example, by the mirror control circuit 305 reading the number of destinations (other apparatuses) shown in a header of the signal to be transmitted. The mirror control circuit 105 controls the directions of the respective mirrors 304a to form the same number of mirror groups as the number of the determined number.

According to the present embodiment, since the numbers of the mirrors 304a belonging to the respective mirror groups can be set in accordance with the distances to the other apparatuses corresponding to the mirror groups, equal levels of quality can be ensured in the communication with the respective other apparatuses regardless of the differences in distance.

The present embodiment has been described for the entry of the number, directions, and distances of the other apparatuses through the input unit 310 and the setting of the mirror groups by the mirror control circuit 305 based on the entered number or distances. The setting of the mirror groups, however, can be performed in other methods.

For example, it is possible to use a method in which a different number or symbol is assigned to each of the mirrors constituting the movable mirror array, and the numbers or symbols of the mirrors belonging to respective mirror groups are specified in accordance with the number of the other apparatuses and the distances to the other apparatuses through the input unit connected to the mirror control circuit. Alternatively, regions of mirrors belonging to respective mirror groups on the movable mirror array may be specified through the input unit.

While the present embodiment has been described for the driving of the respective mirrors constituting the movable mirror array 304 by the actuator, it is possible that the respective mirrors are formed on a silicon wafer and a voltage is applied to create distortion to drive the mirrors about two axes orthogonal to each other and parallel to the mirror surface.

Embodiment 5

Figure 13:
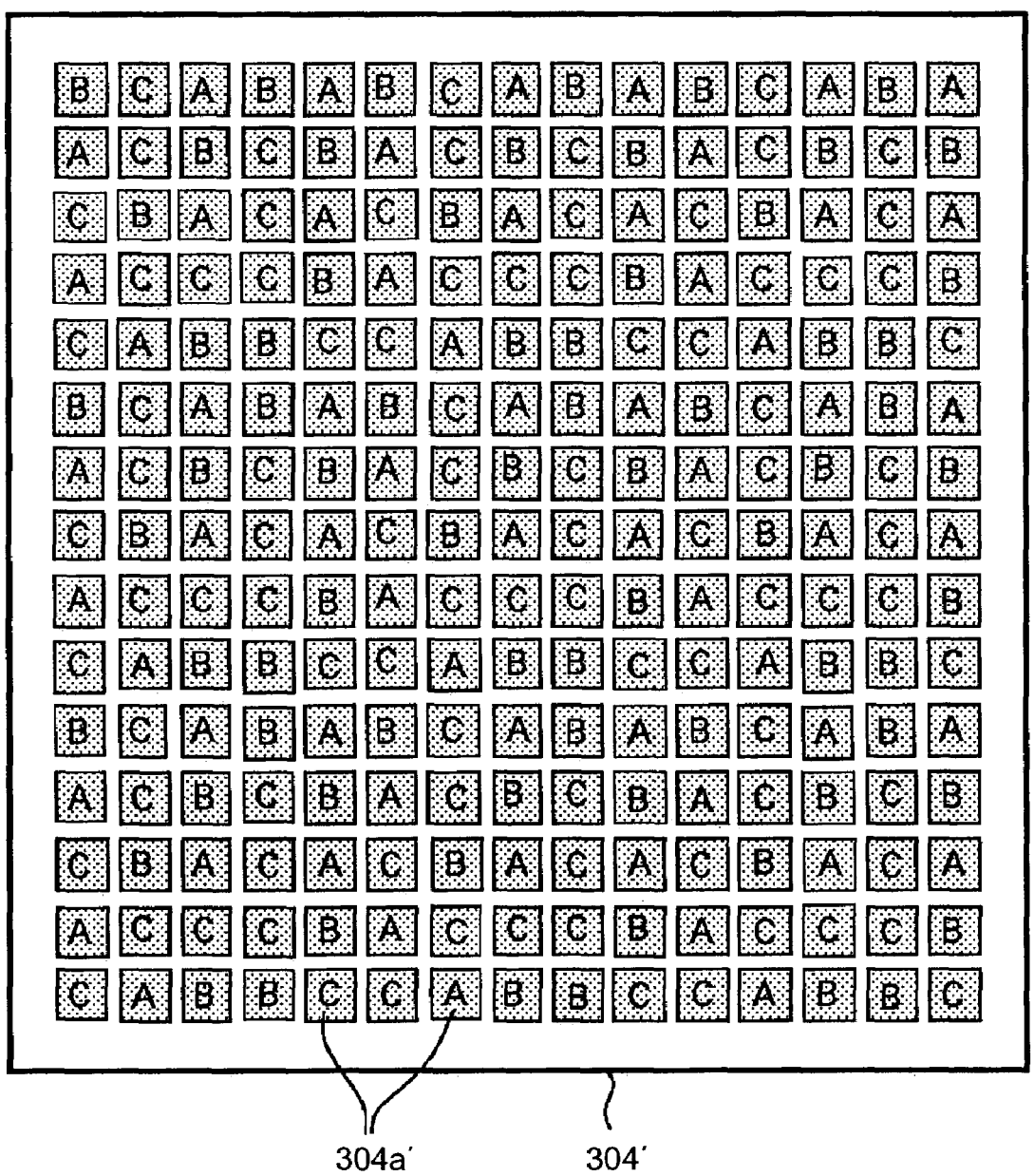
FIG. 13 shows how mirrors are grouped in a movable mirror array when three other apparatuses exist in a free space optics communication system which is Embodiment 5 of the present invention.

Aforementioned Embodiment 4 has been described for the mirror groups formed collectively and adjacent to each other. As shown in FIG. 13, mirrors 304a' belonging to respective mirror groups may be arranged discretely in a movable mirror array 304' (however, they may be arranged regularly to some extent).

FIG. 13 shows three mirror groups formed. Symbols A to C assigned to the respective mirrors represent mirror groups to which those mirrors belong.

Embodiment 6

Figure 14:
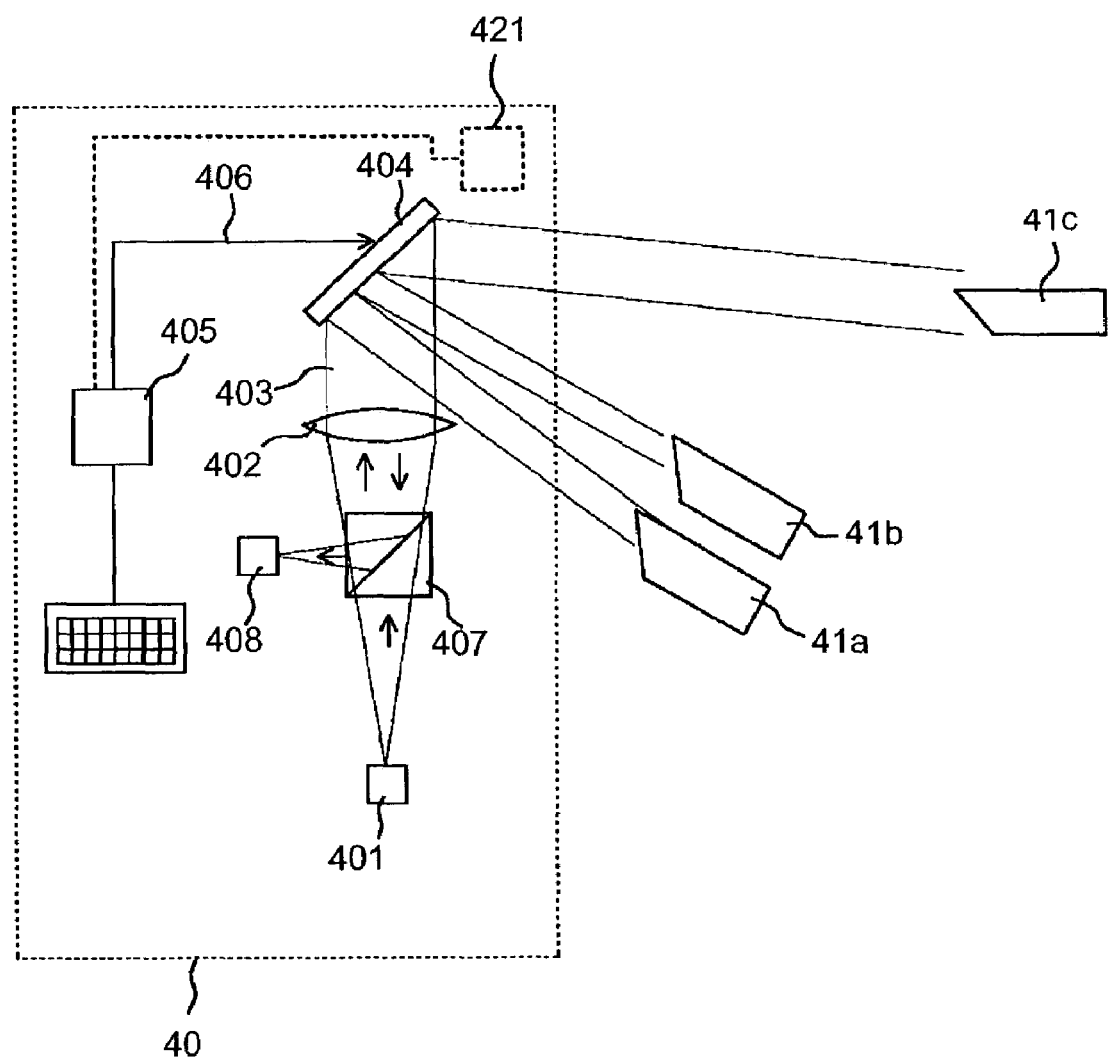
FIG. 14 is a schematic diagram of a free space optics communication system which is Embodiment 6 of the present invention.
Figure 15:
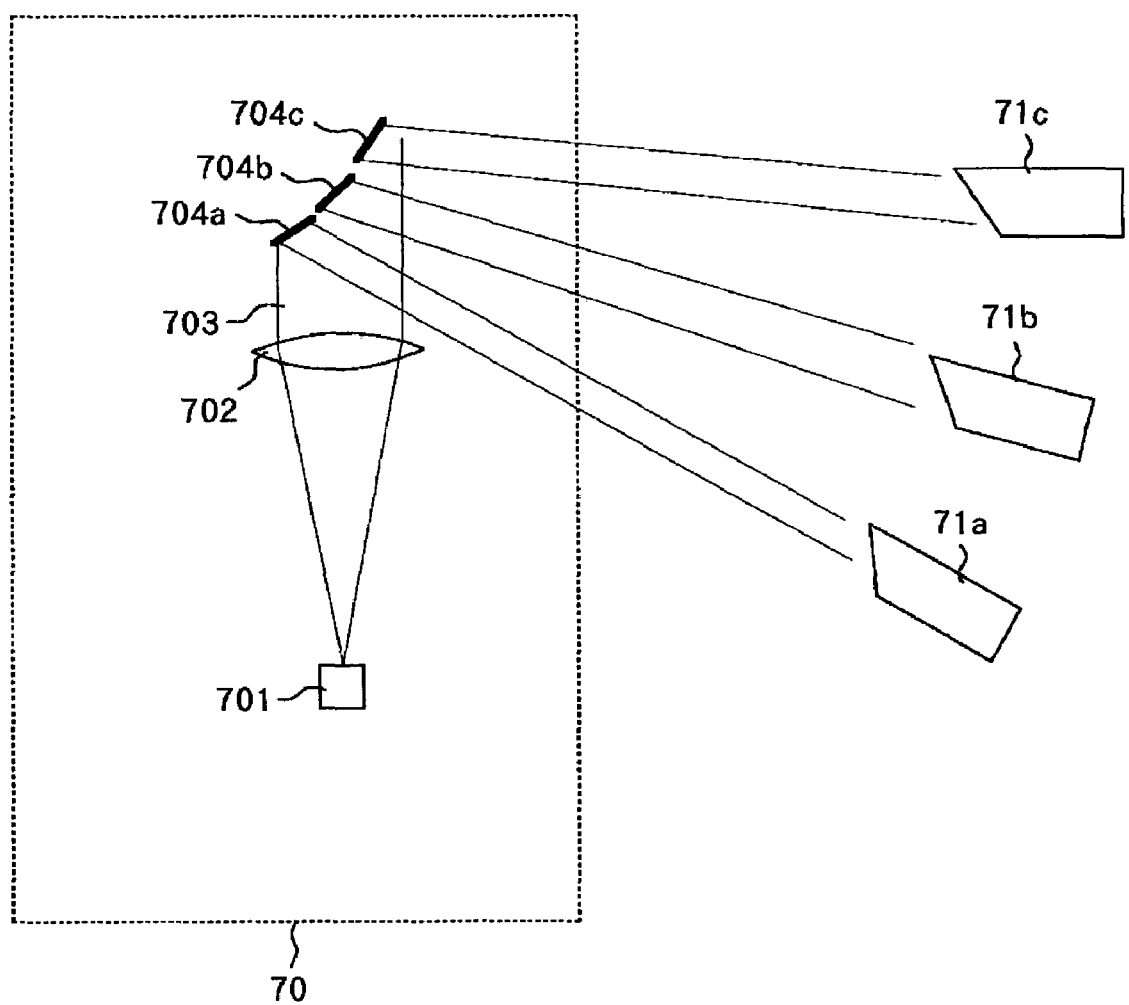
FIG. 15 is a schematic diagram of a conventional free space optics communication system.

While aforementioned Embodiments 4 and 5 have been described on the assumption that one-way communication is performed on a point-to-multipoint basis, the present invention is applicable to bi-directional point-to-multipoint communication. FIG. 14 shows a free space optics communication system assuming the bi-directional communication.

In FIG. 14, reference numeral 40 shows a free space optics communication apparatus installed on the one point side of point-to-multipoint communication according to the present invention. Reference numerals 41a, 41b, and 41c show other free space optics communication apparatuses (hereinafter referred to as "other apparatuses") on the multipoint side installed at a plurality of different points at remote locations.

The free space optics communication apparatus 40 of the present embodiment is configured to have a polarization beam splitter 407 for separating a transmission light signal and a reception light signal and a light-receiving element 408 which are added to the components described in Embodiment 4.

A light signal emitted from a light source 401 enters into the polarization beam splitter 407. Since the incident light from the light source 401 is polarized in a direction for transmission through the polarization beam splitter 407, the light passes through the polarization beam splitter 407 and enters into an optical system 402. The light is changed by the optical system 402 to a light beam 403 which has a substantially parallel shape with slight divergence before incidence on a movable mirror array 404.

The description in Embodiment 4 also applies to the configuration of the movable mirror array 404 and the control of directions of the mirrors 404a in the movable mirror array 404 by an input unit 410 and a mirror control circuit 405.

Thus, the light beam 403 is reflected by three mirror groups formed in the movable mirror array 404 in three different directions in which three other apparatuses 41a, 41b, and 41c are installed, respectively, and the light signal (transmitted light) is received by the respective other apparatuses.

The number of the mirrors belonging to the mirror group corresponding to the farther other apparatus 41c is larger than those of the mirrors belonging to the mirror groups corresponding to the closer other apparatuses 41a and 41b in accordance with the distances, similar to Embodiment 4. For this reason, a larger amount of luminous flux for transmission is emitted to the far other apparatus 41c than that transmitted to the near other apparatuses 41a and 41b.

On the other hand, three light beams transmitted from the respective other apparatuses 41a, 41b, and 41c are reflected by the three mirror groups formed in the movable mirror array 404 toward the optical system 402. These received light beams are polarized in directions for reflection by the polarized light separating surfaces of the polarization beam splitter 407, unlike the transmission light from the light source 401. Thus, the received light beams entered into the polarization beam splitter 407 are reflected by the polarized light separating surfaces and guided to the light-receiving element 408. In this manner, the light signals from the three other apparatuses 41a, 41b, and 41c are received by the single light-receiving element 408.

The number of the mirrors belonging to the mirror group corresponding to the other apparatuses 41c further away of the three other apparatuses is larger than those of the mirrors belonging to the mirror groups corresponding to the closer other apparatuses 41a and 41b in accordance with the distances (to provide a larger light-receiving area on the movable mirror array 404). In other words, as another apparatus is located at a longer distance, a larger number of the mirrors 404a are set for reflecting the light signal to that other apparatus. This can provide substantially equal values of the light received at all the other apparatuses 41a, 41b, and 41c.

In this manner, communication with the plurality of other apparatuses can be performed while substantially equal levels of communication quality are maintained regardless of the communication distances.

As described above, according to the present embodiment, the bi-directional communication can be performed between the free space optics communication apparatus 40 and the plurality of other apparatuses 41a, 41b, and 41c. In addition, equal levels of quality can be provided in transmission and reception to and from all the other apparatuses located at different distances.

When the number or directions of the other apparatuses to be communicated with, or the distances to the other apparatuses are changed, the operator enters a new number, directions, or distances of the other apparatuses through the input unit 410 similar to the description in Embodiment 4. The mirror control circuit 405 outputs a control signal 406 to again set the directions of the respective mirrors 404a of the movable mirror array 404.

In this manner, a number of mirrors constituting the movable mirror array 404 are divided into groups, the number of which corresponds to the number of the other apparatuses actually installed (or the number of the other apparatuses with which there will be communication). It is thus possible to realize the free space optics communication apparatus which can effectively use the luminous flux for transmission from the light source 401 regardless of the number of the other apparatuses and can receive the light beams from the plurality of other apparatuses by the single light-receiving element 408 without waste.

In the present embodiment, the number of the other apparatuses to which communication is possible, and thus the maximum number of mirror groups formed in the movable mirror array 404 are not limited to three.

The aforementioned Embodiments 4 and 5 have been described for the case where the operator enters the directions or distances of the other apparatuses through the input units 310 and 410 and the entered direction or distance information is relied on to control the directions of the respective mirrors of the movable mirror arrays 304 and 404 by the mirror control circuits 305 and 405. Instead of the directions, the operator may enter the position information of the other apparatuses (for example, the latitude or longitude) to control the directions of the respective mirrors in accordance with the entered position information.

In addition, instead of the distances entered by the operator through the input units 310 and 410, detection units 321 and 421 (shown by dotted lines in FIGS. 8 and 14, respectively) may be provided for detecting the distances to the other apparatuses. In this case, the mirror control circuits 305 and 405 set the numbers of mirrors belonging to the respective mirror groups based on the detection results of the detection units 321 and 421.

Embodiment 7

The aforementioned Embodiments 4 to 6 have been described for the setting of the numbers of the mirrors belonging to the respective mirror groups formed in the movable mirror array in accordance with the distances to the respective other apparatuses. When different levels of communication quality are required by a plurality of other apparatuses, the number of mirrors belonging to respective mirror groups may be set in accordance with the required levels of communication quality.

Specifically, for example, the operator enters levels of communication quality required respectively for a plurality of other apparatuses located at substantially equal distances through the input units 310 and 410. The numbers of mirrors belonging to respective mirror groups corresponding to the other apparatuses requiring a higher level of communication quality are set to be larger than the numbers of mirrors belonging to respective mirror groups corresponding to the other apparatuses requiring a normal level of communication quality.

This allows flexible setting in which different levels of communication quality can be provided for the plurality of other apparatuses.

As described above, according to Embodiments 4 to 6, the numbers of the mirrors belonging to the respective mirror groups can be set to the optimal number in accordance with the distances to the respective other apparatuses or the required levels of communication quality. It is thus possible to achieve flexible setting such as equal levels of communication quality provided regardless of the distances to the respective other apparatuses or different levels of communication quality provided for the plurality of other apparatuses.

In addition, since the number of the mirror groups formed in the movable mirror array can be changed, the number of the mirror groups can be set freely in accordance with the number of the other apparatuses. Consequently, the transmission light emitted from the light source can be divided and transmitted to the plurality of other apparatuses without waste, and the received light from the plurality of other apparatuses can be incident on the single light-receiving element without waste. A change in number of the other apparatuses can be responded to flexibly.

While preferred embodiments have been described, it is to be understood that modification and variation of the present invention may be made without departing from the spirit or scope of the following claims.

What is claimed is:

1. A free space optics communication apparatus which uses a light signal propagating through the air to perform informational communication with a plurality of other apparatuses located at different locations, comprising:

a light source which emits a light signal;

a movable mirror array which has a plurality of mirrors which reflect the light signal from said light source arranged in a matrix-like form, directions of the respective mirrors being controllable independently;

a mirror control circuit which controls the directions of said respective mirrors to form, a plurality of mirror groups which reflect the light signal toward the said other apparatuses, in said movable mirror array respectively; and a detection unit which detects distances to said respective other apparatuses, wherein the number of said mirror groups formed in said movable mirror array through the control of the directions of said respective mirrors by said mirror control circuit is changeable;

wherein the number of the mirrors belonging to at least one of the plurality of mirror groups formed in said movable mirror array through the control of the directions of said respective mirrors by said mirror control circuit can be different from the number of the mirrors belonging to the other mirror groups; and wherein said mirror control circuit sets the numbers of the mirrors belonging to said respective mirror groups in accordance with the detection result of said detection unit.

2. The free space optics communication apparatus according to claim 1, wherein said mirror control circuit sets a larger number of the mirrors belonging to the mirror group corresponding to the other apparatus among said plurality of other apparatuses at a longer distance.

3. A free space optics communication apparatus which uses a light signal propagating through the air to perform informational communication with a plurality of other apparatuses located at different locations, comprising:

a light source which emits a light signal;

a movable mirror array which has a plurality of mirrors which reflect the light signal from said light source arranged in a matrix-like form, directions of the respective mirrors being controllable independently;

a mirror control circuit which controls the directions of said respective mirrors to form, a plurality of mirror groups which reflect the light signal toward the said other apparatuses, in said movable mirror array respectively; and an input unit through which information on communication quality with said respective other apparatuses is entered, wherein the number of said mirror groups formed in said movable mirror array through the control of the directions of said respective mirrors by said mirror control circuit is changeable;

wherein the number of the mirrors belonging to at least one of the plurality of mirror groups formed in said movable mirror array through the control of the directions of said respective mirrors by said mirror control circuit can be different from the number of the mirrors belonging to the other mirror groups; and wherein said mirror control circuit sets the numbers of the mirrors belonging to said respective mirror groups in accordance with the information from said input unit.

4. The free space optics communication apparatus according to claim 3, wherein said mirror control circuit sets a larger number of the mirrors belonging to the mirror group corresponding to the other apparatus which requires a higher level of the communication quality indicated in the information entered through said input unit among said plurality of other apparatuses.

5. A free space optics communication apparatus which uses a light signal propagating through the air to perform informational communication with a plurality of other apparatuses located at different locations, comprising:

a light source which emits a light signal;

a movable mirror array which has a plurality of mirrors which reflect the light signal from said light source arranged in a matrix-like form, directions of the respective mirrors being controllable independently;

a mirror control circuit which controls the directions of said respective mirrors to form, a plurality of mirror groups which reflect the light signal toward the said other apparatuses, in said movable mirror array respectively; and a light-receiving element which receives the light signal, wherein the number of said mirror groups formed in said movable mirror array through the control of the directions of said respective mirrors by said mirror control circuit is changeable; and wherein said movable mirror array reflects the light signal incident thereon toward said light-receiving element, and said control circuit controls the directions of said respective mirrors to form a plurality of mirror groups which reflect light signals from said other apparatuses toward said light-receiving element in said movable mirror array, respectively.

6. The free space optics communication apparatus according to claim 5, further comprising a detection unit which detects distances to said respective other apparatuses, wherein said mirror control circuit sets the numbers of the mirrors belonging to said respective mirror groups in accordance with the detection result of said detection unit.

7. The free space optics communication apparatus according to claim 6, wherein said mirror control circuit sets a larger number of the mirrors belonging to the mirror group corresponding to the other apparatus among said plurality of other apparatuses at a longer distance.

* * * * *